(12) United States Patent
Gross

(10) Patent No.: US 6,635,910 B1
(45) Date of Patent: Oct. 21, 2003

(54) SILICON STRAIN GAGE HAVING A THIN LAYER OF HIGHLY CONDUCTIVE SILICON

(75) Inventor: Chris Gross, Yorktown, VA (US)

(73) Assignee: Measurement Specialties, Inc.

( * ) Notice: Subject to any disclaimer, the term of this patent is extended or adjusted under 35 U.S.C. 154(b) by 0 days.

(21) Appl. No.: 09/359,012

(22) Filed: Jul. 22, 1999

(51) Int. Cl.⁷ .............................................. H01L 27/20
(52) U.S. Cl. ...................... 257/254; 257/415; 257/417
(58) Field of Search .............................. 257/254, 415, 257/417; 338/2

(56) References Cited

U.S. PATENT DOCUMENTS

| | | | |
|---|---|---|---|
| 3,624,465 A | * 11/1971 | Moore ................... 317/235 R |
| 3,626,256 A | * 12/1971 | Brown ...................... 317/234 |
| 3,662,312 A | 5/1972 | Thorp et al. | |
| 3,798,754 A | 3/1974 | Price et al. | |
| 3,849,874 A | 11/1974 | Jeffers | |
| 3,922,705 A | * 11/1975 | Yerman | |
| 3,968,466 A | 7/1976 | Nakamura et al. | |
| 4,125,820 A | * 11/1978 | Marshall ........................ 338/4 |
| 4,127,840 A | * 11/1978 | House | |
| 4,188,258 A | 2/1980 | Mounteer et al. | |
| 4,410,870 A | 10/1983 | Pryor ............................. 338/2 |
| 4,422,063 A | * 12/1983 | Pryor ............................. 338/2 |
| 4,459,159 A | 7/1984 | O'Mara ....................... 148/1.5 |
| 4,503,709 A | 3/1985 | Ruhle .......................... 73/727 |
| 4,510,671 A | 4/1985 | Kurtz et al. | |
| 4,748,433 A | 5/1988 | Jackson et al. ................ 338/6 |
| 4,786,887 A | 11/1988 | Bringmann et al. ........... 338/2 |
| 4,800,759 A | 1/1989 | Hirata et al. | |
| 4,993,143 A | 2/1991 | Sidner et al. | |
| 5,239,870 A | 8/1993 | Kaneko | |
| 5,505,093 A | 4/1996 | Giedd et al. ................... 73/774 |
| 5,508,676 A | 4/1996 | Grange et al. | |
| 5,510,276 A | 4/1996 | Diem et al. .................... 437/24 |
| 5,554,875 A | 9/1996 | Hartauer | |
| 5,622,901 A | 4/1997 | Fukada | |
| 5,665,250 A | 9/1997 | Iwata et al. | |
| 5,742,222 A | 4/1998 | Young et al. | |
| 5,877,425 A | * 3/1999 | Suzuki et al. | |

OTHER PUBLICATIONS

Patent Abstracts of Japan, vol. 12, No. 254 (E–634), Jul. 16, 1988 and JP 63 042179 A (Nippon Denso Co. Ltd.), Feb. 23, 1988 *abstract*.

Patent Abstracts of Japan, vol. 11, No. 249 (E–532), Aug. 13, 1987 and JP 62 061344 A (Oki electric Ind Co. Ltd.), Mar. 19, 1987 *abstract*.

* cited by examiner

*Primary Examiner*—Fetsum Abraham
(74) *Attorney, Agent, or Firm*—Duane Morris LLP

(57) ABSTRACT

A semiconductor strain gage having an electrically resistive substrate layer and a layer of electrically conductive silicon supported by the substrate layer. The silicon layer can be an epitaxial silicon layer grown on a surface of the substrate layer or a diffused or ion-implanted layer formed in the surface of the substrate layer. Also, a force measuring and detecting device including a force responsive member and the above-described semiconductor strain gage attached to the force responsive member, the strain gage measuring forces applied to the force responsive member.

12 Claims, 2 Drawing Sheets

SILICON STRAIN GAGE HAVING A THIN LAYER OF HIGHLY CONDUCTIVE SILICON

FIELD OF INVENTION

This invention relates to a silicon semiconductor strain gage, and in particular, to a silicon semiconductor strain gage comprising a thin layer of highly conductive silicon on a semi-insulating host substrate layer.

BACKGROUND OF THE INVENTION

Silicon is commonly used as a semiconductor sensor material because it exhibits many large physical effects to various applied sensitivities or signals and permits cost-efficient batch fabrication of sensors. One very useful effect that silicon exhibits is piezoresistance. This effect is exhibited by silicon in response to an applied a mechanical strain. This effect is considerable in silicon because the average mobility of electrons and holes therein is largely affected by strain.

Numerous strain gages based on silicon semiconductor materials have been designed and are presently available. Many of these strain gages are fabricated from bulk single crystal silicon using conventional photolithography and etching techniques.

A major disadvantage of such semiconductor strain gages is that their strain gage resistance depends directly on their thickness. When manufactured in bulk, the strain gage resistance from gage to gage can vary by a factor of 3 or more because current etching processes are incapable of maintaining thickness uniformity, on the order of 0.0005 inches or 12 microns. This is mainly due to the pre-etching thickness of the gages which is typically about 0.006 inches and requires over 90% of the silicon to be removed. Overshooting the gage thickness by a mere 0.0001 inch results in a 20% change in the gage=s strain gage resistance.

Accordingly, a need exists for a silicon strain gage with improved uniformity of strain gage resistance.

SUMMARY OF THE INVENTION

In accordance with the invention, a semiconductor strain gage comprising an electrically resistive substrate layer and a layer of electrically conductive silicon supported by the substrate layer. The silicon layer can be an epitaxial silicon layer grown on a surface of the substrate layer or a diffused or ion-implanted layer formed in the surface of the substrate layer.

In further accordance with the invention, a force measuring and detecting device comprising a force responsive member and the above-described semiconductor strain gage attached to the force responsive member, the strain gage measuring forces applied to the force responsive member.

BRIEF DESCRIPTION OF THE DRAWINGS

The advantages, nature and various additional features of the invention will appear more fully upon consideration of the illustrative embodiments now to be described in detail in connection with accompanying drawings wherein.

It should be understood that these drawings are for purposes of illustrating the concepts of the invention and are not to scale.

DETAILED DESCRIPTION OF THE INVENTION

Figure 1:
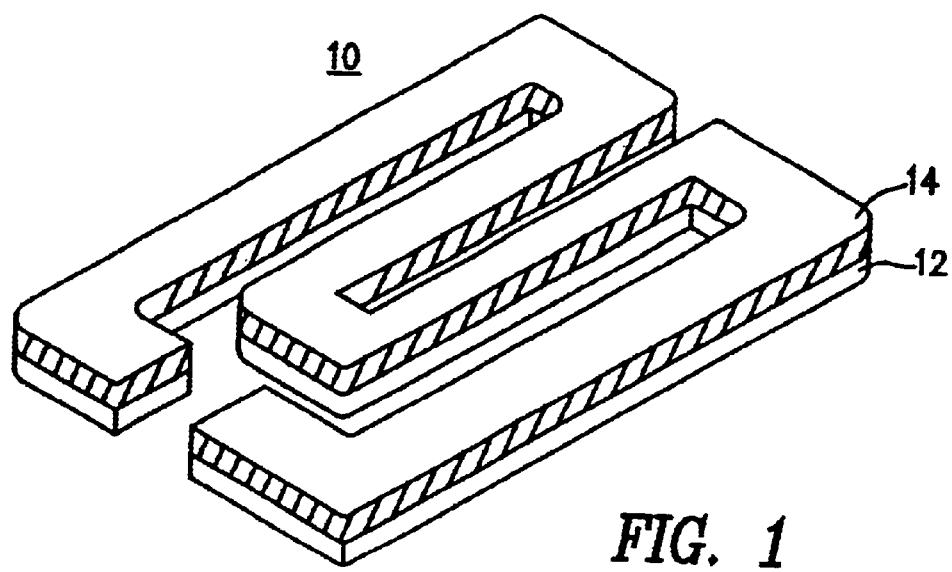
FIG. 1 is a perspective view of a silicon semiconductor strain gage according to an embodiment of the present invention.

FIG. 1 shows a perspective view of a silicon semiconductor strain gage 10 according to the present invention. The strain gage 10 of the invention is a piezoresistive device that utilizes a force to cause a resistance change due to mechanical strain. The strain gage 10 comprises a thin layer 14 of highly electrical-conductive (highly conductive) silicon of a desired conductivity type supported by a relatively highly electrical-resistive (highly resistive) host substrate layer 12. The host substrate layer 12 is typically composed of crystalline or polycrystalline semi-insulating material, such as intrinsic silicon or lightly doped (p or n type) silicon.

The strain gage 10 of the invention is especially useful for measuring forces applied to metallic force responsive members of various configurations, such as beams, diaphragms, plates, rods and the like. Such force responsive members are commonly used in pressure measuring applications as strain gage pressure transducers, in weight measuring applications as strain gage load cells and strain gage transducers, and in other measuring and like applications which use force responsive members.

Figure 2:
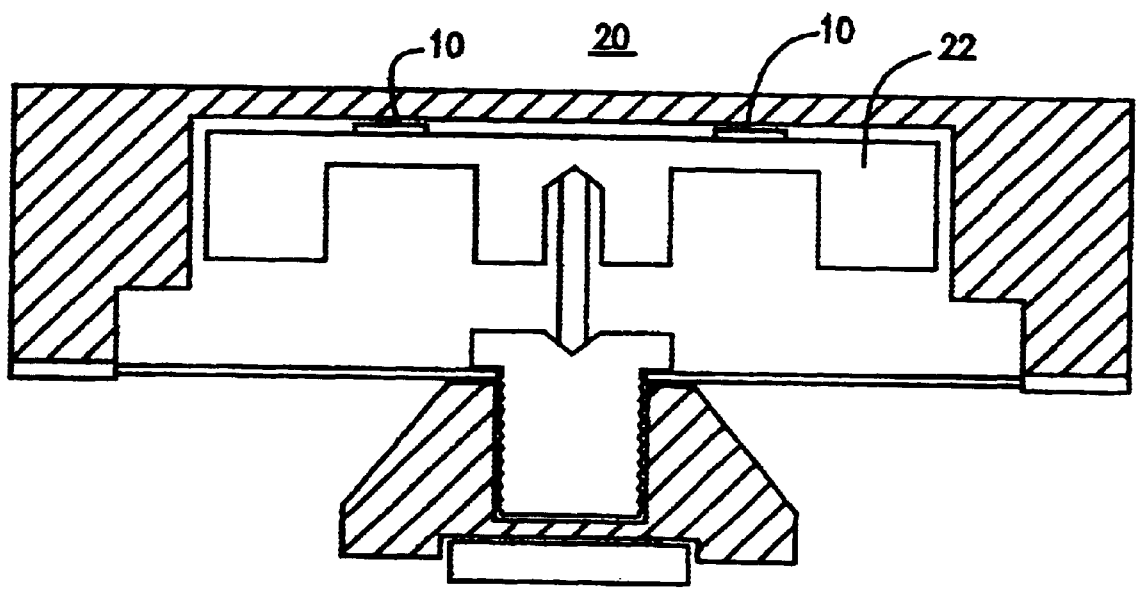
FIG. 2 is an elevational view of a force measuring and detecting device which employs the strain gage of the invention.

FIG. 2 shows a typical force measuring and detecting device 20 that employs strain gages 10 of the invention. Such a device is described in co-pending U.S. patent application Ser. No. 09/146,890 assigned to Measurement Specialties, Inc., the assignee herein. This Patent application is incorporated herein by reference to show an exemplary force measuring and detecting device which can utilize the strain gage device of the invention. The device includes a metal force responsive member 22 with strain gages 10 according to the invention attached thereto using conventional glass bonding or other suitable attaching techniques. The strain gages are attached to the force responsive member in a Wheatstone bridge circuit. Although this device includes a force responsive member with four strain gages, one of ordinary skill in the art will recognize that force responsive members of other devices can employ as few as a single strain gage.

As can be seen by referring again to FIG. 1, the strain gage of the invention can be conventionally configured in an M or sepertine shape. However, many other available configurations have been previously described that are adapted for the direction and sense of the stresses or strains produced in a corresponding force responsive member in response to a force and/or are adapted for resistance changes produced by such stresses in crystalline silicon for a given conductivity type, crystal orientation and direction of current flow. It is contemplated that the strain gage of the invention can be fabricated in virtually any of such strain gage configurations if desired.

In a typical embodiment of the strain gage of the invention (FIG. 1), the highly conductive silicon layer comprises a 2–4 micron (0.00008–0.00017 inches) thick, 0.025–0.060 ohm-cm epitaxial silicon layer (epi-silicon layer), and the host substrate layer comprises an 8–10 micron (0.00033–0.00042 inches) thick, 10 ohm-cm or greater single crystal silicon layer. This strain gage embodiment can be made in bulk by growing an epi-silicon layer on an appropriately polished and cleaned surface of a single crystal silicon wafer using any conventional epitaxial deposition technique.

Epitaxial deposition generally utilizes vapor-phase deposition in an epitaxial reactor. In a typical process, the polished and cleaned surface of the wafer is heated and the epi-silicon layer is deposited thereon by reacting hydrogen with a silicon compound such as silicon tetrachloride in a carrier gas. The thickness and the conductivity of the epi-layer of silicon can be controlled by regulating the deposition rates and introducing controlled amounts of suitable dopants into the carrier-gas stream.

After epitaxial deposition, the epi-layer side of the wafer is patterned into individual strain gages using conventional photolithographic and etching techniques. The patterning typically extends about 12–14 microns into the wafer from the epi-layer side thereof. The substrate layer side of the wafer is then lapped from a starting thickness of about 0.015 inches to a thickness of about 100 microns. After lapping, the epi-layer side of the wafer is coated with resist material and the wafer is chemically back-etched using conventional techniques until the pattern of the gages are visible to provide an overall gage thickness (including the epi-silicon layer) of 10 to 14 microns. The resist material is then conventionally removed and metallized electrical contacts are formed on the epi-silicon layer portion of the gages.

Figure 3:
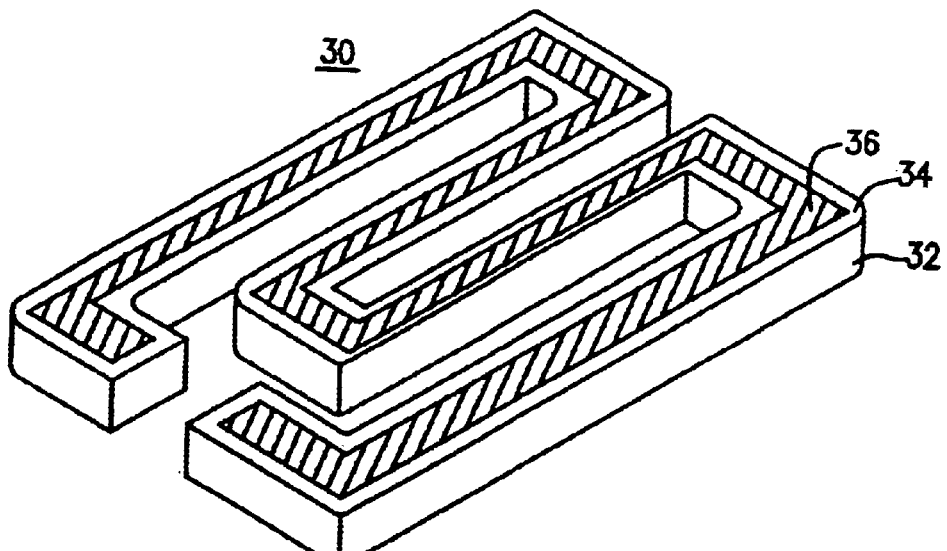
FIG. 3 is a perspective view of a silicon semiconductor strain gage according to a second embodiment of the invention.

FIG. 3 shows a strain gage 30 according to a second embodiment of the invention. In this embodiment, a thin, highly conductive layer 36 is formed in a surface 34 of a silicon-based host substrate layer 32. This highly conductive layer can be formed by diffusion or ion-implantation.

Although not shown, other embodiments of the strain gage can also comprise a highly conductive epitaxial silicon layer grown on an insulating host substrate layer made from single crystal alumina or any other highly resistive material that permits epitaxial growth of silicon.

The strain gage of the invention advantageously provides a strain gage resistance which is generally independent of the overall thickness of the gage. A strain gage of the invention made from an 0.025 ohm-cm, 6 micron (0.00025 inches) thick epi-silicon layer grown on a host substrate of 25 ohm-cm silicon has the following resistance as a function of overall gage thickness:

| Overall gage Thickness | Resistance |
| --- | --- |
| 16.8 microns (0.0007 inches) | 2994 ohms |
| 14.4 microns (0.0006 inches) | 2995 ohms |
| 12.0 microns (0.0005 inches) | 2997 ohms |
| 9.6 microns (0.0004 inches) | 2998 ohms |
| 7.2 microns (0.0003 inches) | 2999 ohms |

Another benefit of the strain gage of the invention is that it can be manufactured in large numbers with higher resistance values that are more uniform from gage to gage than conventional strain gages as demonstrated in Tables 1 and 2 below. In particular, Table 1 shows the resistance values of strain gages selected from 5 different wafers of strain gages of the invention and Table 2 shows the resistance values of strain gages selected from 5 different wafers of conventional strain gages. All the strain gages were of the same dimensions. The resistance measurements were obtained by glass bonding each selected strain gage to a 0.072 thick beam-like force responsive member and applying the same force to each member.

TABLE 1

| #.of Gage Measured | Resistance in Ohms |
| --- | --- |
| 1 | 4200 |
| 21 | 4260 |
| 3 | 4330 |
| 4 | 4420 |
| 5 | 4480 |
| 6 | 4340 |
| 7 | 4320 |
| 8 | 4180 |
| 9 | 4270 |
| 10 | 4320 |
| 11 | 4280 |
| 12 | 4230 |
| 13 | 4200 |
| 14 | 4250 |
| 15 | 4400 |
| 16 | 4300 |
| 17 | 4180 |
| 18 | 4200 |
| 19 | 4120 |
| 20 | 4100 |
| 21 | 4150 |
| 22 | 4200 |
| 23 | 4005 |
| 24 | 4250 |
| 25 | 4020 |
| 26 | 3980 |
| 27 | 4180 |
| 28 | 4230 |
| 29 | 4170 |
| 30 | 4120 |
| 31 | 4300 |
| 32 | 4350 |
| 33 | 4120 |
| 34 | 4280 |
| 35 | 4180 |
| 36 | 4340 |
| 37 | 3960 |
| 38 | 3860 |
| 39 | 3940 |
| 40 | 3860 |
| 41 | 3890 |
| 42 | 4140 |
| 43 | 3780 |
| 44 | 3880 |
| 45 | 4010 |
| 46 | 4200 |
| 47 | 3810 |
| 48 | 3860 |
| 49 | 4200 |
| 50 | 4250 |
| 51 | 4160 |
| 52 | 3940 |
| 53 | 3880 |
| 54 | 3900 |
| 55 | 3910 |
| 56 | 3890 |
| 57 | 4000 |
| 58 | 3780 |
| 59 | 3890 |
| 60 | 3980 |
| 61 | 3910 |
| 62 | 4000 |
| 63 | 3890 |
| 64 | 3980 |
| 65 | 3920 |
| 66 | 3990 |
| 67 | 3990 |
| 68 | 3980 |
| 69 | 3980 |
| 70 | 4000 |
| 71 | 4050 |
| 72 | 4010 |
| 73 | 3900 |
| 74 | 4000 |
| 75 | 3900 |
| 76 | 4050 |

TABLE 1-continued

| #.of Gage Measured | Resistance in Ohms |
| --- | --- |
| 77 | 4020 |
| 78 | 4000 |
| 79 | 3850 |
| 80 | 3900 |
| 81 | 4010 |
| 82 | 4030 |
| 83 | 4100 |
| 84 | 4010 |
| 85 | 3980 |
| 86 | 3850 |
| 87 | 3900 |
| 88 | 4090 |
| 89 | 3990 |
| 90 | 3850 |

TABLE 2

| # of Gage Measured | Resistance |
| --- | --- |
| 1 | 1240 |
| 2 | 1280 |
| 3 | 1290 |
| 4 | 1300 |
| 5 | 1360 |
| 6 | 1350 |
| 7 | 1440 |
| 8 | 1450 |
| 9 | 1370 |
| 10 | 1330 |
| 11 | 1440 |
| 12 | 1540 |
| 13 | 1450 |
| 14 | 1530 |
| 15 | 1590 |
| 16 | 1660 |
| 17 | 1530 |
| 18 | 1660 |
| 19 | 1600 |
| 20 | 1650 |
| 21 | 1320 |
| 22 | 1300 |
| 23 | 1370 |
| 24 | 1250 |
| 25 | 1310 |
| 26 | 1440 |
| 27 | 1420 |
| 28 | 1450 |
| 29 | 1460 |
| 30 | 1480 |
| 31 | 1340 |
| 32 | 1360 |
| 33 | 1380 |
| 34 | 1370 |
| 35 | 1380 |
| 36 | 1420 |
| 37 | 1500 |
| 38 | 1520 |
| 39 | 1570 |
| 40 | 1660 |
| 41 | 1200 |
| 42 | 1300 |
| 43 | 1350 |
| 44 | 1340 |
| 45 | 1260 |
| 46 | 1420 |
| 47 | 1340 |
| 48 | 1340 |
| 49 | 1420 |
| 50 | 1400 |
| 51 | 1390 |
| 52 | 1390 |
| 53 | 1380 |

TABLE 2-continued

| # of Gage Measured | Resistance |
| --- | --- |
| 54 | 1450 |
| 55 | 1390 |
| 56 | 1530 |
| 57 | 1480 |
| 58 | 1450 |
| 59 | 1410 |
| 60 | 1480 |
| 61 | 1460 |
| 62 | 1300 |
| 63 | 1310 |
| 64 | 1470 |
| 65 | 1400 |
| 66 | 1530 |
| 67 | 1520 |
| 68 | 1600 |
| 69 | 1530 |
| 70 | 1520 |
| 71 | 1370 |
| 72 | 1330 |
| 73 | 1400 |
| 74 | 1410 |
| 75 | 1400 |
| 76 | 1360 |
| 77 | 1370 |
| 78 | 1560 |
| 79 | 1530 |
| 80 | 1550 |
| 81 | 1390 |
| 82 | 1400 |
| 83 | 1330 |
| 84 | 1330 |
| 85 | 1320 |
| 86 | 1220 |
| 87 | 1300 |
| 88 | 1240 |
| 89 | 1190 |
| 90 | 1190 |
| 91 | 1400 |
| 92 | 1410 |
| 93 | 1390 |
| 94 | 1240 |
| 95 | 1360 |
| 96 | 1250 |
| 97 | 1340 |
| 98 | 1230 |
| 99 | 1210 |
| 100 | 1240 |

Using data from Table 1, the strain gages of the invention boasted a mean resistance of about 4070 ohms, a maximum resistance of about 4460 ohms and a minimum resistance of about 3780 ohms. The standard and average standard deviations for these strain gages were 168.2 ohms and 97.1 ohms respectively and the percent average standard deviation was 2.39.

In contrast, the conventional strain gages of Table 2 demonstrated a mean resistance of only about 1399.8 ohms, a maximum resistance measuring about 1660 ohms and minimum resistance measuring about 1190 ohms. The standard deviation for these strain gages was 111.754 ohms and the standard deviation was 7.984.

While the foregoing invention has been described with reference to the above embodiments, various modifications and changes can be made without departing from the spirit of the invention. Accordingly, all such modifications and changes are considered to be within the scope of the appended claims.

What is claimed is:

1. A force measuring and detecting device comprising:
a force responsive member; and a semiconductor strain gage attached to the force responsive member, the strain gage measuring forces applied to the force responsive member, the strain gage including an electrically resistive substrate layer and a layer of electrically conductive silicon disposed on the substrate layer, wherein the substrate layer has a thickness of about 8–10 microns.

2. The device according to claim 1, wherein the force responsive member is metallic.

3. The device according to claim 1, wherein the substrate layer is composed of one of a semi-insulating material and an insulating material.

4. The device according to claim 3, wherein the semi-insulating material is silicon and the insulating material is alumina.

5. The device according to claim 1, wherein the substrate layer has a resistivity of greater than 10 ohm-cm.

6. The device according to claim 1, wherein the silicon layer is composed of epitaxial silicon.

7. The device according to claim 6, wherein the epitaxial silicon has a thickness of about 2-microns.

8. The device according to claim 1, wherein the silicon layer has a resistivity of about 0.025–0.060 ohm-cm.

9. The device according to claim 2, wherein the substrate layer is glass bonded to the force responsive member.

10. The device according to claim 1, wherein the substrate layer is glass bonded to the force responsive member.

11. The device according to claim 1, wherein the silicon layer is a diffused layer.

12. The device according to claim 1, wherein the silicon layer is an ion-implanted layer.

* * * * *